(12) United States Patent
Levander et al.

(10) Patent No.: US 7,452,253 B2
(45) Date of Patent: Nov. 18, 2008

(54) PROPULSION SYSTEM OF MARINE VESSEL

(75) Inventors: Oskar Levander, Turku (FI); Susanna Hannula, Turku (FI)

(73) Assignee: Wartsila Finland Oy, Vaasa (FI)

( * ) Notice: Subject to any disclaimer, the term of this patent is extended or adjusted under 35 U.S.C. 154(b) by 0 days.

(21) Appl. No.: 11/720,310

(22) PCT Filed: Oct. 19, 2005

(86) PCT No.: PCT/FI2005/050363

§ 371 (c)(1),
(2), (4) Date: May 25, 2007

(87) PCT Pub. No.: WO2006/056654

PCT Pub. Date: Jun. 1, 2006

(65) Prior Publication Data

US 2008/0009208 A1    Jan. 10, 2008

(30) Foreign Application Priority Data

Nov. 29, 2004   (FI)   ................................. 20045463

(51) Int. Cl.
*B63H 5/20* (2006.01)

(52) U.S. Cl. ........................................................ 440/53

(58) Field of Classification Search ................... 440/53, 440/66
See application file for complete search history.

(56) References Cited

U.S. PATENT DOCUMENTS

| 3,996,877 A | 12/1976 | Schneekluth |
| 5,016,553 A * | 5/1991 | Spencer ..................... 114/151 |
| 5,941,744 A | 8/1999 | Levedahl et al. |

FOREIGN PATENT DOCUMENTS

| CA | 2373462 | 11/2000 |
| DE | 10208595 | 9/2003 |
| EP | 1013544 | 6/2000 |
| FI | 76032 | 8/1983 |
| JP | 07017489 | 1/1995 |
| NO | 138726 | 8/1975 |
| WO | 9711878 | 5/2007 |

* cited by examiner

*Primary Examiner*—Stephen Avila
(74) *Attorney, Agent, or Firm*—Smith-Hill and Bedell

(57) ABSTRACT

A propulsion system for a marine vessel is provided with at least one skeg in its hull and with a first propulsion device provided at the stern area of the vessel for providing propulsion power. A second propulsion device is located in connection with the skeg and comprises a system for changing the direction of its thrust effect.

6 Claims, 2 Drawing Sheets

PROPULSION SYSTEM OF MARINE VESSEL

Figure 1:
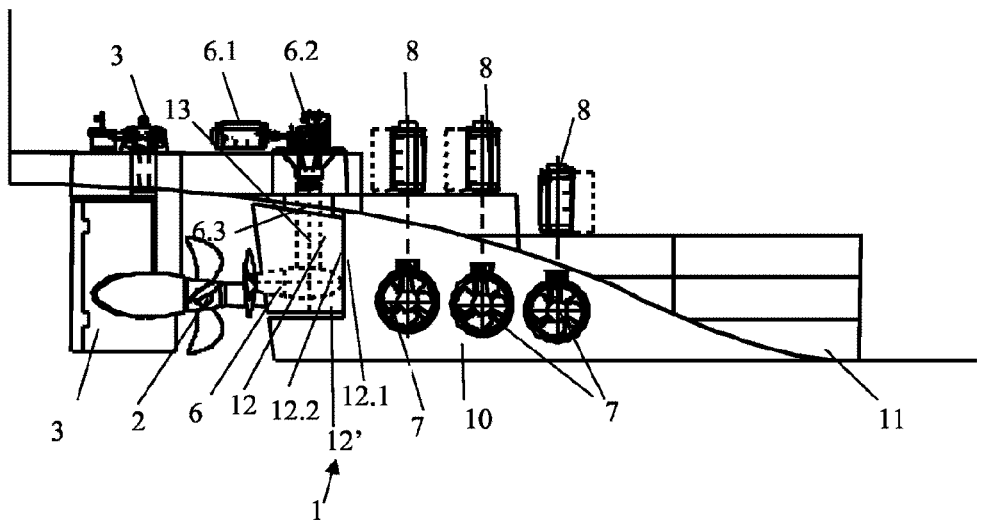

This is a national stage application filed under 35 USC 371based on International Application No. PCT/FI2005/050363 filed Oct. 19, 2005, and claims priority under 35 USC 119 of Finnish Patent Application No. 20045463 filed Nov. 29, 2004.

Invention relates to a propulsion system of a marine vessel, which is provided with at least one skeg in its hull, and with a first propulsion device provided at the stern area of the vessel for providing propulsion power, wherein the propulsion system comprises a second propulsion devices located in connection with the skeg.

Ships and other marine vessels are typically provided with machinery particularly for assisting harbour manoeuvring. Some vessels, like large cruise ships, require considerably severe side thrust power in order to give sufficient manoeuvring characteristics for the vessel. Several options are known to accomplish adequate lateral force at manoeuvring situation.

Large tunnel thrusters have traditionally been used both in the bow and stern of the vessel. Pods provided with electric motors have also been used in large cruise ship and they offer excellent manoeuvring characteristics. However, some ship-owners considers the pod unattractive solutions, owing to reliability issues. With regard to tunnel thrusters, there is often a space problem i.e. it can be difficult to fit sufficient amount of tunnel thrusters in the stern of a vessel.

Conventional steerable thrusters could be a partial solutions to the problem. However, the efficiency of traditional steerable thrusters is somewhat low at high speeds. They also give rise to extra drag when they are in the water flow. This makes them less desirable. Retractable thrusters could also be considered. They are lowered when needed and pulled up into the hull when not in use. However, they require a lot of space inside the vessel and are expensive.

In the following, with the term "skeg" it is meant a stern of the keel of a vessel near the sternpost, or generally a fin-like construction usually on the rear bottom of a ship.

It is an object of the invention to provide a propulsion system of a marine vessel, which solves the above mentioned problems.

According to the invention the propulsion system of a marine vessel, which is provided with at least one skeg in its hull, and with a first propulsion device provided at the stern area of the vessel for providing propulsion power, wherein the propulsion system comprises a second propulsion devices located in connection with the skeg. It is characteristic to the invention that the second propulsion device in connection device in connection with the skeg comprises a system for changing the direction of its thrust effect.

The system for changing the direction of thrust effect comprise support and control equipment of the second propulsion device which support and control equipment is capable of rotating the second propulsion device about an axis substantially perpendicular to the direction of the thrust effect. The second propulsion device is shaped to continue the skeg shape thus providing minimal drag. Preferably the second propulsion device comprises a steerable thruster device.

In order to provide a streamlined structure the second propulsion device and the skeg have substantially parallel counter surfaces mating with each other when the second propulsion device is positioned substantially at zero angle. More specifically, the aft edge of the skeg in front of the steerable thruster is shaped as an arc adapting as an arc adapting a radius substantially equal to the distance between the aft end edge of the skeg and the turning axis of the steerable thruster. This allows structure of the second propulsion device to be in near connection with the skeg.

The second propulsion device extends forward of its the vertical turning axis. This gives the benefit that a large opening for water to flow through it is created between the skeg and second propulsion device, when it is turned about its axis.

Figure 2:
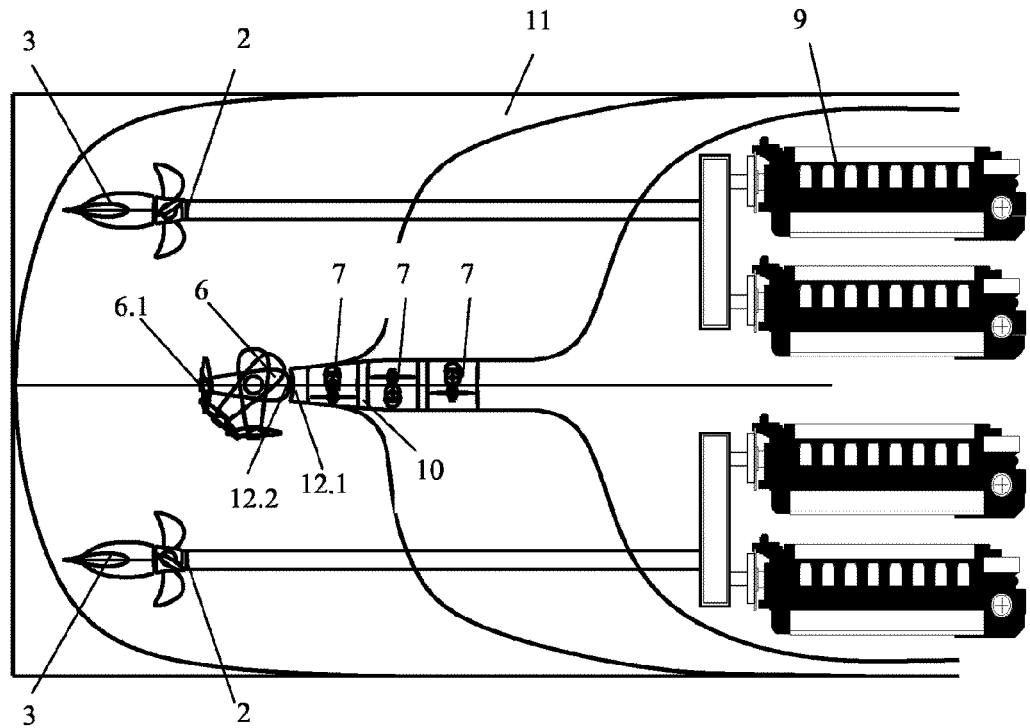
Figure 3:
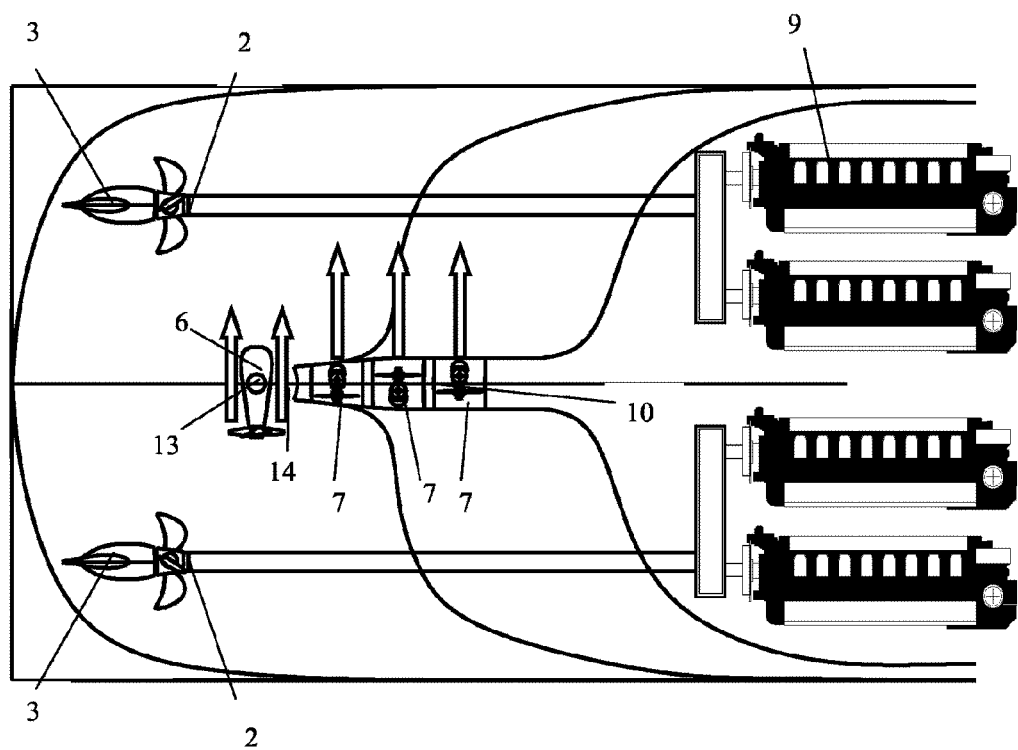

The invention will be described with the reference to the accompanying schematic drawings in which FIG. 1 illustrates a side view of a stern section of a vessel showing preferred embodiment of the invention, FIG. 2 illustrates upper view FIG. 1, and FIG. 3 illustrates the embodiment of FIG. 1 at position in which maximum lateral thrust is provided.

In the following description of the FIGS. 1-3 the second propulsion device 6 comprising a system for changing the direction of its thrust effect is called as a steerable thruster. In the figures there is shown a stern of a ship. The ship shown in the figures is provided with a first propulsion device 2 here including two shaft lines as the main propellers of the ship. Both the shaft lines are equipped with a rudder system 3. The ship's hull 11 is provided with a skeg 10 at its stern.

A steerable thruster 6 is integrated into the skeg 10 of the vessel. The skeg includes also tunnel thrusters 7 along with their power sources 8. The steerable thruster 6 is connected to its power source 6.1 and comprises support 6.3 and control 6.2 equipment for rotating the steerable thruster 6. By means of those the steerable thruster 6 can be turned more than 90 degrees to both sides to direct thrust in the desired direction. The steerable thruster is integrated into the skeg 10 to give rise to minimal increase of water flow resistance along the hull of the ship. The steerable thruster and its strut 12 are hydrodynamically shaped to continue the skeg 10 shape and allow for a hydro-dynamically smooth flow of the water. Further, the steerable thruster is provided with a propeller 6.1, which can be of the feathering type to further minimise the extra resistance of the thruster when not in use. That is, the blades are turnable to either direction until they are substantially parallel to longitudinal axis of the vessel. The steerable thruster 6 can therefore be resting at feathering position when the ship is running forward at service speed.

The steerable thruster 6 is in connection with the skeg 10 in a way explained in the following. The strut 12 of the steerable thruster 6 extends forward of its vertical turning axis 13. In other words the strut 12 has a fin-like structure, forward extension 12', extending forward from its vertical turning axis 13, and respectively the skeg 10 has an opening corresponding the size of the forward extension 12'. This means that a large opening 14 is created between the skeg 10 and the steerable thruster 6, when it is turned to the side. The water flow, illustrated by the arrows in the figure 3, from the propeller on the steerable thruster 6 can therefore easily pass between the skeg and the thruster strut and allow greater side thrust. The slipstream from the propeller will not hit the skeg to as large an extent. The aft end edge of the skeg 10 in front of the steerable thruster is shaped as an arc adapting a radius substantially equal to the distance between the aft end edge of the skeg 10 and the turning axis 13 of the steerable thruster 6. Also forward edge of extension 12'of the strut 12 has surface of corresponding shape forming counter surfaces. This way the counter surfaces 12.1, 12.2 are formed which mate with each other when the second propulsion device 6 is positioned substantially at zero angle. This minimises the gap between the skeg and steerable thruster when the steerable thruster is aligned with the direction of the vessel. This is in order to reduce the disturbance to the water flow.

The steerable thruster 6 according to the invention can be used in a variety of configurations:

Single skeg or multiple skeg applications
Twin, triple or quadruple screw applications
With electric or mechanical drive for the thruster
The steerable thruster 6 can have a z-drive or a L-drive
The skeg can have none, one or many tunnel thrusters 7
Applicable to all possible types of ships The steerable thruster 6 can be used for manoeuvring in combination with tunnel thrusters 7 and the main propellers, i.e. the first propulsion device 2 with rudders 3. It can be also connected to an automatic manoeuvring system.

Invention is not limited to the embodiments shown but several modifications may be contemplated within the scope of protection defined by the accompanying claims. For example the second propulsion device 6 may be positioned in connection with the skeg so that the skeg extends forward and aft directions from the second propulsion device 6. In this case the skeg extending aft from the second propulsion device is provided with a space for the propeller of the second propulsion device 6. With this kind of an arrangement the aft direction extending skeg provides eg. a support for docking the ship.

The invention claimed is:

1. A marine vessel having a longitudinal direction and a stern area and comprising:
    a hull which is provided with at least one skeg,
    a first propulsion device in the stern area of the vessel for providing propulsion power, the first propulsion device including two shaft-driven propellers located to opposite respective sides of a center line of the hull and spaced from the skeg transversely of the hull, and
    a second propulsion device aft of the skeg for imparting thrust to the hull, the second propulsion device being turnable relative co the hull between a first position in which the second propulsion device imparts thrust in the longitudinal direction of the vessel and a second position in which the second propulsion device imparts thrust transverse to the longitudinal direction of the vessel,
    and wherein the second propulsion device has a forward extension which minimizes a gap between the second propulsion device and the skeg when the second propulsion device is in the first position and forms an opening between the second propulsion device and the skeg for water to flow through when the second propulsion device is in the second position,
    the forward extension of the second propulsion device and the skeg have substantially parallel counter surfaces mating with each other when the second propulsion device is in the first position,
    and the skeg has an aft surface forward of the second propulsion device, said aft surface being arcuate and having a radius substantially equal to the distance between the aft surface of the skeg and the turning axis of the second propulsion device.

2. A marine vessel according to claim 1, wherein the second propulsion device is integrated into the skeg for minimizing water flow resistance when the second propulsion device is in the first position.

3. A marine vessel according to claim 2, wherein the second propulsion device is shaped to continue the skeg shape thus providing minimal drag.

4. A marine vessel according to claim 1, wherein the second propulsion device comprises a steerable thruster device.

5. A marine vessel according to claim 1, wherein the second propulsion device has a strut that extends forward of the turning axis.

6. A marine vessel according to claim 1, wherein the skeg is substantially aligned with a center line of the hull and the two shaft-driven propellers are at substantially equal distances from the center line of the hull.

* * * * *